United States Patent
Waissi et al.

(10) Patent No.: US 10,946,317 B2
(45) Date of Patent: Mar. 16, 2021

(54) FUEL FILTER HAVING HIGH RESISTANCE TO ICING

(71) Applicant: SAFRAN AIRCRAFT ENGINES, Paris (FR)

(72) Inventors: Bellal Waissi, Vert Saint Denis (FR); Thomas Chauveau, Dammarie les Lys (FR); Philippe Vertenoeuil, Paris (FR); José Rodrigues, Moissy-Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 0 days.

(21) Appl. No.: 16/308,281

(22) PCT Filed: May 31, 2017

(86) PCT No.: PCT/FR2017/051361
§ 371 (c)(1),
(2) Date: Dec. 7, 2018

(87) PCT Pub. No.: WO2017/212142
PCT Pub. Date: Dec. 14, 2017

(65) Prior Publication Data
US 2019/0193002 A1 Jun. 27, 2019

(30) Foreign Application Priority Data
Jun. 8, 2016 (FR) ...................................... 1655233

(51) Int. Cl.
*B01D 29/21* (2006.01)
*B01D 35/00* (2006.01)

(52) U.S. Cl.
CPC ........... *B01D 29/21* (2013.01); *B01D 35/005* (2013.01); *B01D 2201/12* (2013.01); *B01D 2201/313* (2013.01)

(58) Field of Classification Search
CPC ..... B01D 29/21; B01D 27/06; B01D 2201/12
USPC ................................. 210/493.1, 493.3, 493.5
See application file for complete search history.

(56) References Cited

U.S. PATENT DOCUMENTS

| | | | | |
|---|---|---|---|---|
| 3,288,299 | A * | 11/1966 | Paton | B01D 27/02 210/487 |
| 3,487,943 | A * | 1/1970 | Buckman | B01D 29/012 210/457 |
| 2003/0196419 | A1 | 10/2003 | Peter et al. | |

FOREIGN PATENT DOCUMENTS

| | | |
|---|---|---|
| EP | 2 535 550 A2 | 12/2012 |
| JP | H02-70706 U | 5/1990 |
| WO | WO 02/053258 A1 | 7/2002 |

OTHER PUBLICATIONS

International Search Report as issued in International Patent Application No. PCT/FR2017/051361, dated Sep. 7, 2017.

* cited by examiner

*Primary Examiner* — Benjamin M Kurtz
(74) *Attorney, Agent, or Firm* — Pillsbury Winthrop Shaw Pittman LLP

(57) ABSTRACT

A cartridge for a filtering device, includes a cylindrically arranged pleated cloth, the pleats being parallel to the generatrix of the cylinder, wherein the cylinder includes a non-pleated region which is to be placed across from a fuel inlet into the filtering device.

4 Claims, 6 Drawing Sheets

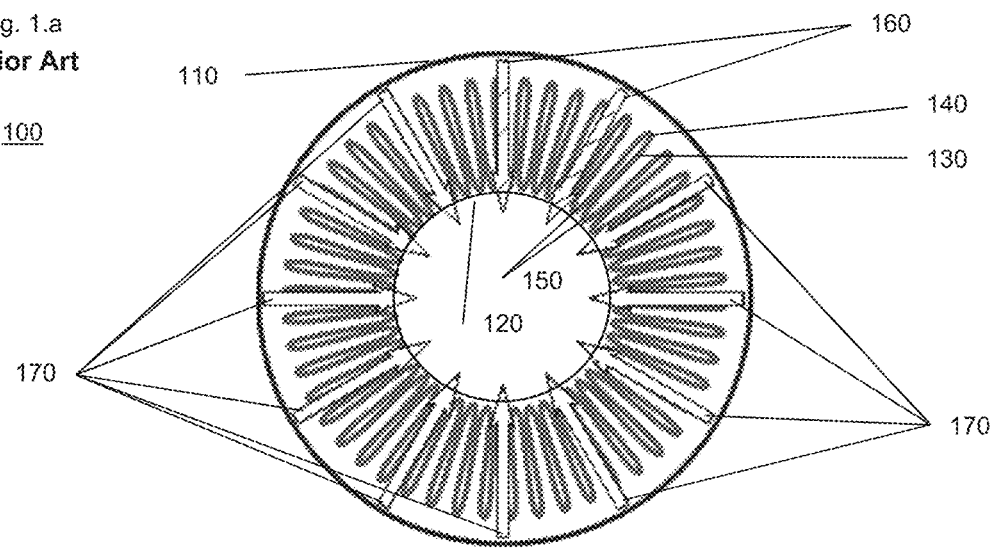
Fig. 1.a
Prior Art
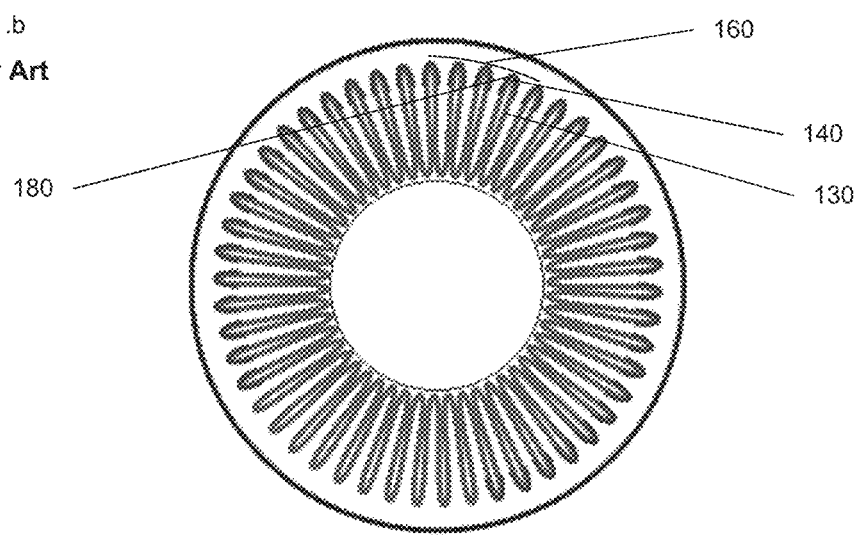
Fig. 1.b
Prior Art

Fig. 1.c
Prior Art
180
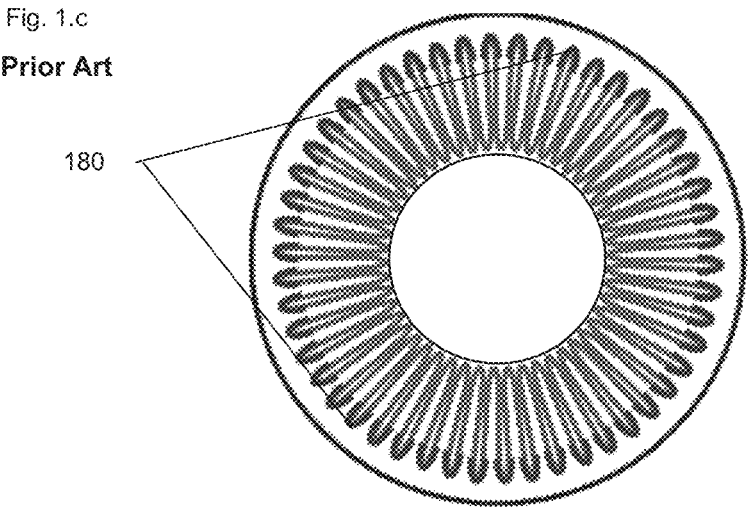
Fig. 1.d
Prior Art
180
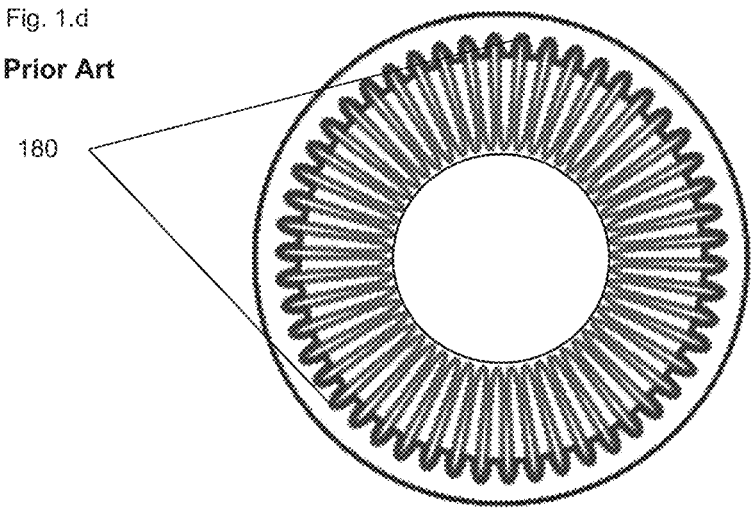

Fig. 2.a
200
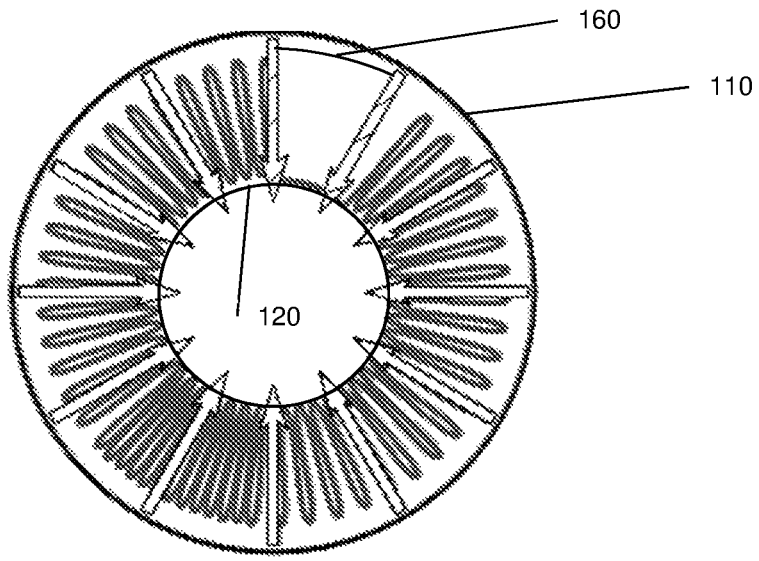
Fig. 2.b
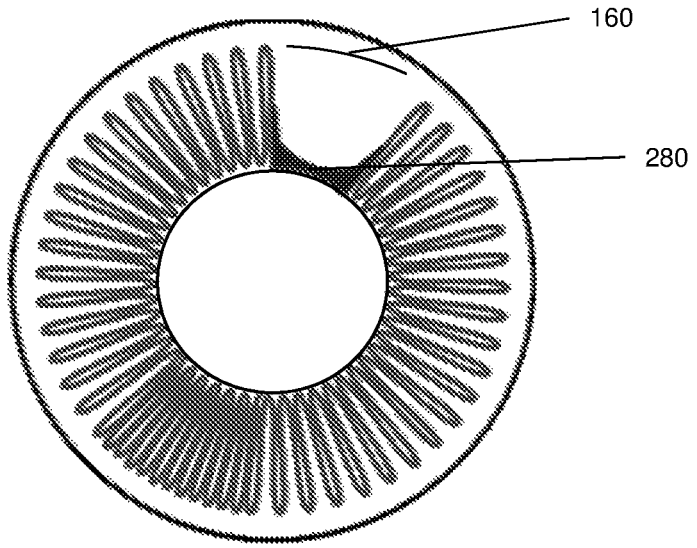

Fig. 2.c
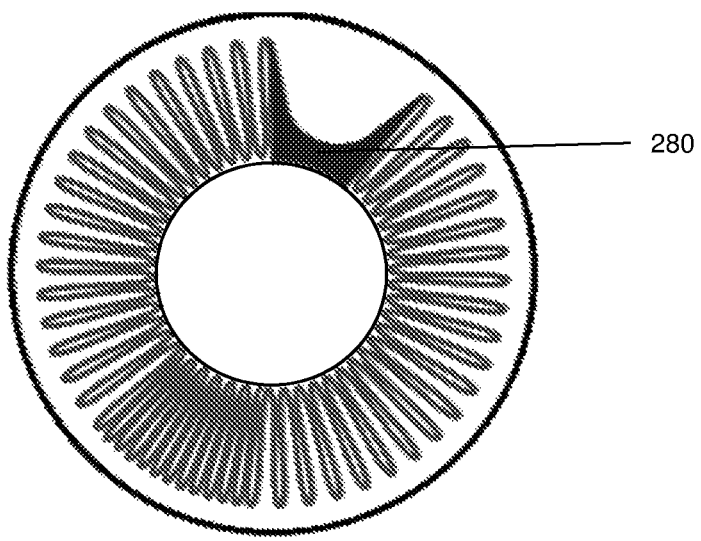
Fig. 2.d
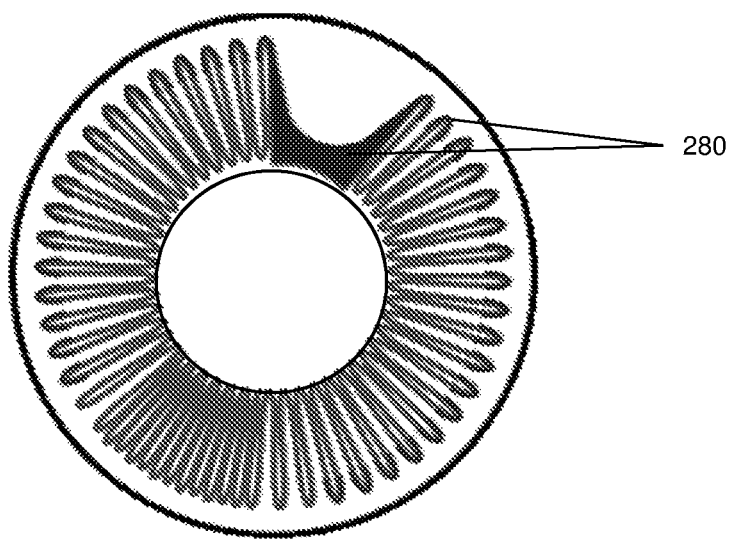

Fig. 2.e
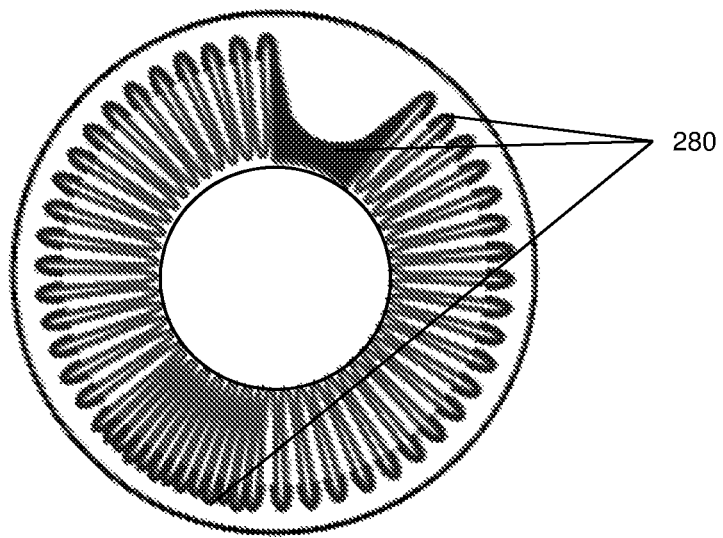
Fig. 3
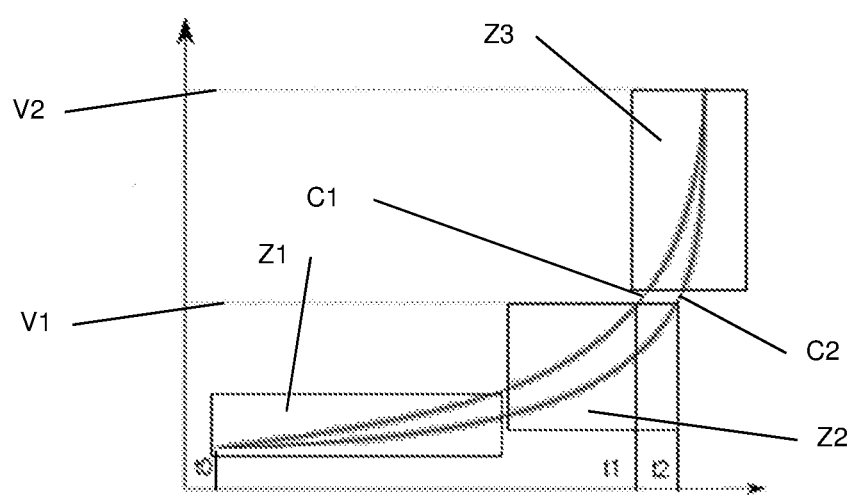

FUEL FILTER HAVING HIGH RESISTANCE TO ICING

CROSS REFERENCE TO RELATED APPLICATIONS

This application is the U.S. National Stage of PCT/FR2017/051361, filed May 31, 2017, which in turn claims priority to French Patent Application No. 1655233 filed Jun. 8, 2016, the entire contents of all applications are incorporated herein by reference in their entireties.

TECHNICAL FIELD OF THE INVENTION

The subject matter of the invention is a fuel filter with high resistance to icing. The field of the invention is that of filtering in fuel supply systems. More specifically, the field of the invention is that of filtering in aeronautics supply systems.

PRIOR ART

In a fuel supply system, the fuel usually passes into a low pressure part of a fuel pump, then into exchangers. The fuel is next directed to a filter then passes through a high pressure pump. The fuel next passes into a fuel regulator then goes through injectors before being injected into a combustion chamber.

The fuel filter filters contaminants coming from tanks and more generally from upstream of the system in order to deliver clean fuel to the sensitive components present downstream of the supply system.

The integration of filters in fluid systems has two main difficulties. The first is the detection of their clogging by contaminants, in order to provide for a replacement of the filter. The second is their sensitivity to icing, which brings about early clogging of the filter.

This resistance of the fuel system to icing is a certification requirement (CS-E 560 (e)). This requirement is very restrictive and it may prove necessary to improve the resistance to icing.

A fuel filter is mainly equipped with a filtering cartridge and a bypass valve, or bypass, which opens in the event of clogging of the cartridge.

FIG. 1.*a* shows a sectional view of a filter 100 of the prior art. FIG. 1.*a* shows that the filter 100 of the prior art comprises a cylindrical casing 110 into which a filtering cartridge is introduced.

FIG. 1.*a* shows that a filtering cartridge comprises a cylindrical core 120 on which has been attached a filtering media. Conventionally, a filtering media is a pleated cloth. The fuel is introduced into the filter and has to go through the filtering media to arrive inside the core and continue its flow in the supply system to which the filter 100 of the prior art belongs.

FIG. 1.*a* shows a filtering media composed of pleats 130, each pleat having an outer fold 140 and inner folds 150 that it shares with adjacent pleats.

The filtering media is attached to two flanges bonded to the two bases of the cylinder formed by the media, the cylindrical core being installed at the centre between the two flanges in order to stiffen the assembly mechanically. A flange is, for example, a crown of which the large radius corresponds to the radius of the cylinder and of which the small radius corresponds to the radius of the core. A flange is, for example, a disc of which the radius is equal to that of the cylinder.

FIG. 1.*a* illustrates a fuel inlet zone 160 corresponding to an angular fraction, around 1/12 in our example, of the cylinder constituted of the filter. FIG. 1.*a* also illustrates the direction 170 of circulation of the fuel in the filter. The fuel arrives from the inlet zone, corresponding to the angular sector 160, then diffuses on the filter periphery, then to the core of the filter.

During a period of icing of the fuel supply system, ice, from water contained in the fuel under negative temperature, accumulates continually, relatively rapidly, on the cartridge until it clogs it and thus causes the opening of the bypass. Thereafter, the downstream part of the fuel system is subjected to icing, and also to contamination (the fuel not passing through the filtering cartridge, it is no longer filtered).

FIG. 1.*b* illustrates a first icing step during which ice 180 is deposited on the outer folds of the pleats. Firstly, ice spares the pleats situated opposite, symmetrically with respect to the axis of the cylinder of the core, the fuel inlet 160.

FIG. 1.*c* illustrates a second icing step during which all the outer folds are covered with ice 180.

Finally, FIG. 1.*d* illustrates a third icing step in which the filter of the prior art is blocked, ice 180 having clogged the free spaces between the outer folds. At this stage the supply system opens the bypass of the filter and non-filtered fuel arrives downstream of the supply system.

One of the key characteristics of a fuel filter during the icing test is the duration before opening of the filter bypass.

Indeed, fuel icing periods are notably cold start-ups of the engine. Yet, these periods are, by nature, transitory, of the order of several minutes to several tens of minutes. Once the start-up has passed, the engine and its systems begin to heat up and are no longer under so-called icing-up conditions.

In the prior art, ice is deposited continuously with the arrival of the fuel, that is to say along the direction of circulation illustrated by the figures. The pleats become clogged one by one starting from the fuel inlet zone up to the diametrically opposite zone.

A small volume of ice suffices to cover a large amount of pleats with a thin layer of ice and thereby extensively clog the cartridge. Indeed, the pleats are clogged as soon as the accumulated ice covers their outer fold.

The invention proposes a solution for delaying clogging of a filter and thus for delaying the opening of a bypass.

SUMMARY OF THE INVENTION

The solution of the invention consists in creating a non-pleated zone on the angular sector of the cartridge at the level of the fuel inlet. The fuel will be de facto directed to this privileged ice accretion zone on its arrival in the filter.

The zone being empty, it will enable the expansion of a large volume of ice while keeping a small surface of pleats covered with ice.

In order to remain at equal filtering surface area compared to a filter of the prior art and thereby retain the same capacity to retain contamination, the pleats are going to be concentrated in the zone diametrically opposite to the fuel inlet.

In this aim, one aspect of the invention relates to a cartridge for a filtering device, said cartridge comprising a cylindrically arranged pleated cloth, the pleats being parallel to the generatrix of the cylinder, characterised in that the cylinder comprises a non-pleated zone, the non-pleated zone being intended to be positioned facing a fuel inlet into the filtering device.

Apart from the main characteristics that have been mentioned in the preceding paragraph, the method/device according to the invention may have one or more additional characteristics among the following, considered individually or according to all technically possible combinations thereof:

the cylinder comprises a zone of concentrated pleats opposite to the non-pleated zone;

the cartridge comprises a cylindrical core, inner folds of the pleated cloth cylindrically arranged around the core being bonded onto flanges at the bases of the cylinder formed by the filtering media;

the cylindrically arranged pleated cloth comprises two sheets, a first pleated sheet and a second non-pleated sheet;

the pleat density is a function of the angular sector.

BRIEF DESCRIPTION OF THE FIGURES

Other characteristics and advantages of the invention will become clearer from reading the description that follows, with reference to the appended figures, which illustrate:

FIG. 1.a, a sectional view of a filter of the prior art with an indication of the direction of arrival and circulation of the fuel in the filter;

FIGS. 1.b to 1.d, an illustration of the progressive clogging of a filter of the prior art;

FIG. 1.b, start of icing on the outer parts of the pleats;

FIG. 1.c, the icing has colonised all the pleats;

FIG. 1.d, the filter is clogged;

FIG. 2.a, a sectional view of a filter using a cartridge according to the invention;

FIGS. 2b to 2.e, an illustration of progressive clogging of a filter using a cartridge according to the invention;

FIG. 2.b, start of icing in the zone provided to concentrate the icing;

FIG. 2.c, the icing extends into the zone provided to concentrate it;

FIG. 2.d, the icing begins to colonise the surface of the pleats;

FIG. 2.e, the icing extends to all the pleats without however having clogged the filter;

FIG. 3, an illustration of the gain obtained with the invention, and

For greater clarity, identical or similar elements are marked by identical reference signs in all of the figures.

Figure 4:
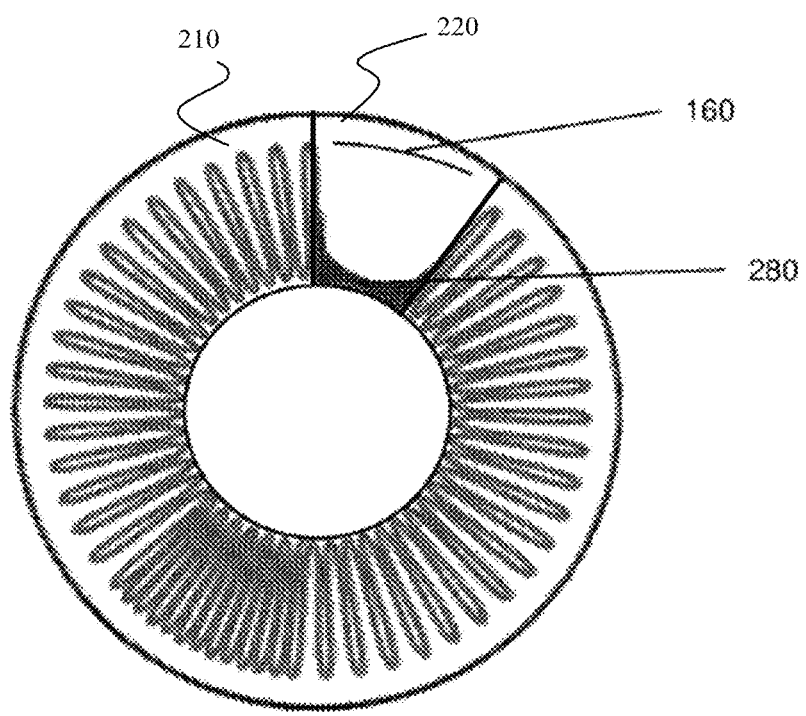
FIG. 4, a sectional view of a filter using a cartridge according to an embodiment of the invention.

The invention will be better understood on reading the description that follows and by examining the figures that accompany it. These are presented by way of indication and in no way limit the invention.

DETAILED DESCRIPTION OF AN EMBODIMENT

FIG. 2.a shows a filter 200 comprising a casing 110 into which a filtering cartridge according to the invention has been introduced. It may be noted here that the casing does not change between the prior art and the invention.

FIG. 2.a shows a zone 160, corresponding to a zone for admitting fuel into the casing, in which the cartridge does not comprise pleats.

In the invention, at the level of the angular sector corresponding to the zone for admitting fuel into the filter, the filtering media is attached flat on the core of the cartridge.

A non-homogeneous pleating of the filtering media is thus achieved. Since the filtering power of a filter is linked to the surface area of the filtering media, the fact that a non-pleated zone exists implies a densification of the distribution of the pleats in the pleated zones.

In particular, the filtering media is arranged to obtain a zone of concentrated pleats in a zone diametrically opposite to the non-pleated zone.

A cartridge is thereby obtained for which the pleat density depends on the angular sector.

An asymmetric cartridge is thereby obtained, that is to say a cartridge for which the pleat density is not constant as a function of the angular sector of the considered cartridge. This implies that such a cartridge has a direction of introduction into the casing: the non-pleated zone has to be located facing the fuel inlet.

In a preferred alternative, a zone with high pleat density is created in the angular sector diametrically opposite to the fuel inlet angular sector. A sector with high pleat density is thereby created. In this alternative, in the intermediate zones, between the non-pleated zone and the zone with high pleat density, the pleat density is that of a standard filter.

This pleating may be achieved with a filtering media of constant thickness, that is to say by using one continuous sheet of filtering media.

In an alternative of the invention, two sheets of filtering media are used, one for the pleated zone, one for the non-pleated zone, that are bonded contiguously, at the level of an inner fold, onto the core of the cartridge. Potential loss of filtering surface area due to the use of two sheets is thereby limited.

Once the pleating has been done and the filtering media bonded onto the flanges of the cartridge, it is observed that the cycle of blocking by icing evolves favourably.

The description details the implementation of a fuel supply system, but its teaching also applies to any supply system making a fluid pass through.

FIG. 2.b illustrates a first icing step, corresponding to the first step of icing of a filter of the prior art, during which ice 180 is deposited on the outer folds of the pleats. For a filter according to the invention, in this first step ice 280 is deposited fully in the non-pleated zone 160 and fully spares all the pleats of the cartridge according to the invention.

FIG. 2.c illustrates a second icing step, corresponding to the second step of icing of a filter of the prior art, during which ice 180 is deposited on all the outer folds of the pleats. For a filter according to the invention, in this second step ice 280 continues to be deposited, while getter thicker, fully in the non-pleated zone and fully spares all the pleats of the cartridge according to the invention.

FIG. 2.d illustrates a third icing step, corresponding to the third step of icing of a filter of the prior art, during which ice 180 has blocked the filter of the prior art. FIG. 2.d shows that at this step ice 280 has not yet colonised all the outer folds of the filtering media.

FIG. 2.e illustrates a fourth icing step, corresponding to a step of icing of a filter of the prior art in which the filter of the prior art is clogged. In this step the filter according to the invention is still operational even though ice 280 has colonised all of the outer folds.

For a filter according to the invention, in this third step ice continues to thicken in the non-pleated zone and begins to colonise a part of the outer folds. The filter according to the invention thus remains operational. It will only be clogged in a later step.

With a filter using a cartridge according to the invention, the blocking of the filter, and thus the opening of the bypass, is delayed.

FIG. 4 is a sectional view of a filter using a cartridge according to an embodiment of the invention. The filter of FIG. 4 includes a first pleated sheet 210 and a second non-pleated sheet 220.

FIG. 3 shows a graph with on the x-axis the time and on the y-axis a blocking percentage. On the y-axis there are two noteworthy values:

A first value V1 corresponding to the opening of the bypass,

A second value V2 corresponding to 99% blocking.

FIG. 3 shows a first curve C1 corresponding to a filter of the prior art, a second curve C2 corresponding to a filter using a cartridge according to the invention.

FIG. 3 also shows:

A zone Z1 corresponds to the first phase of clogging of the cartridge, that is to say the phase where ice begins by accumulating in the zone where the pleats have been deconcentrated.

A zone Z2 corresponds to the second phase, where ice has reached the part of the cartridge where the pleats are identical between a conventional cartridge and the asymmetric cartridge.

A zone Z3 corresponds to the final phase, where ice has clogged the part of the cartridge where the pleating has been concentrated.

In the zone Z1, there is thus a cartridge according to the invention which, for a same duration (thus a same amount of ice that arrives on the cartridge), becomes clogged less quickly (the pressure difference at the input and output terminals of the cartridge increases less quickly). This is represented by the chronology of the accumulation of ice illustrated above.

In the zone Z2, the two cartridges behave in the same way vis-à-vis ice, there is thus no longer an increase in the difference between the two curves.

In the zone Z3, the two curves join up because the cartridge according to the invention becomes clogged quicker than the cartridge of the prior art. Indeed, once ice has reached the zone where the pleats have been condensed, ice can reach the pleats less than in the case of a conventional cartridge, and thus a same volume of ice "blocks" a greater proportion of cartridge.

This is not a problem since this zone Z3 is purely theoretical in the event of actual presence of a bypass valve. Indeed, the opening threshold of said valve is supposed to be exceeded, thus no flow or ice arrives any longer on the filtering cartridge.

The observation that the two cartridges arrive at the same pressure differential at the end of icing is due to the fact that the same filtering surface area has been clogged. Indeed, more pleat surface area has been reached in the first phase (thanks to the de-concentration of the pleats), but less has been reached in the final phase (due to the concentration of pleats).

At 100% icing, the two curves are theoretically supposed to give an infinite pressure difference: the filter is blocked, nothing more comes out of it.

FIG. 3 illustrates that with a cartridge according to the invention the bypass valve is open at t2>t1, where t1 is the instant of opening of the bypass valve for a filter of the prior art.

The difference t2−t1 represents the increase in the duration before opening of the bypass valve.

In a quantitative manner, it suffices to dimension a supply system to have t2−t1>=1 minute in order of magnitude so that the solution begins to be particularly interesting (according to the order of magnitude of the engine transitional regimes where icing-up conditions occur, such as start-ups). In all dimensioning cases, t2 remaining greater than t1, the invention is interesting.

Another advantage of the invention is that during the duration [t1−t0] the system operates with less head loss in the filter, which is beneficial for items of equipment downstream of the filter that are thus going to be supplied better during icing.

It is also possible to imagine that the two advantages are going to be in practice even more important than represented, because the solution, based on the principle of the increase in the surface area that can be reached at the start of icing, may create another beneficial phenomenon.

Indeed, in the first zone of the cartridge, it is very probable, according to feedback on equipment, that the turbulences inherent to any confined flow of a certain speed cause an additional accretion of ice in the inter-pleat volume. In which case, not only t2−t1 is increased, but the total ice accumulation capacity of the cartridge is also increased, which results in a blue curve which will reach the 99% clogged stage later than the red curve (and no longer simultaneously).

Thus, with the invention, the duration of resistance to icing is increased without affecting the capacity to filter contaminants, or the size, or the weight of the filter and a major problem in aeronautics is thus addressed.

The advantages are multiple:

Much less occurrence of bypass (valve) of the filter in the event of slight clogging: increase in the lifetime of downstream equipment, which will thus experience very little contamination;

Increase in the lifetime of equipment also via the reduction in head loss during icing (equipment downstream well supplied);

Facilitated compliance with standards relative to icing (the opening of the bypass valve can be regulated with greater freedom because significant pressure differences are reached less quickly);

Extension of the field of use (less limitation of use of the airplane, even in the case of input temperature of engine fuel <5° C. as presently);

Facilitated logistics because there is no longer need for antifreeze.

The invention claimed is:

1. A system comprising a cartridge and a fuel filtering device, the fuel filtering device including a fuel inlet, the cartridge comprising a cylindrically arranged pleated cloth, the pleats being parallel to a generatrix of a cylinder defined by the cylindrically arranged pleated cloth, wherein:

the cylinder comprises a non-pleated zone, the non-pleated zone being positioned facing the fuel inlet, and the cylinder comprises a zone with a first pleat density opposite to the non-pleated zone, intermediate zones between the non-pleated zone and the zone with the first pleat density having a second pleat density that is smaller than said first pleat density, said second pleat density being a density comprised between the first pleat density and a zero pleat density.

2. The cartridge for a filtering device according to claim 1, wherein the cartridge comprises a cylindrical core, inner folds of the pleated cloth cylindrically arranged around the core being bonded onto flanges at bases of the cylinder formed by the cylindrically arranged pleated cloth.

3. The cartridge for a filtering device according to claim 1, wherein the cylindrically arranged pleated cloth comprises two sheets, a first pleated sheet and a second non-pleated sheet.

4. The cartridge for a filtering device according to claim 1, wherein a pleat density is a function of an angular sector of the cylindrically arranged pleated cloth.

* * * * *